US012673677B2

(12) United States Patent (10) Patent No.: US 12,673,677 B2
Porter et al. (45) Date of Patent: Jul. 7, 2026

(54) VEHICLE CONTROL SYSTEMS FOR ADJUSTING CRUISE CONTROL SETTINGS

(71) Applicant: GM GLOBAL TECHNOLOGY OPERATIONS LLC, Detroit, MI (US)

(72) Inventors: Audrey Devin Porter, Warren, MI (US); Kevin A. O'Dea, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 18/905,715

(22) Filed: Oct. 3, 2024

(65) Prior Publication Data

US 2026/0097764 A1 Apr. 9, 2026

(51) Int. Cl.
*B60W 30/14* (2006.01)
*B60W 10/04* (2006.01)
(52) U.S. Cl.
CPC .......... *B60W 30/143* (2013.01); *B60W 10/04* (2013.01); *B60W 2420/403* (2013.01); *B60W 2520/105* (2013.01); *B60W 2520/28* (2013.01); *B60W 2540/10* (2013.01); *B60W 2540/12* (2013.01); *B60W 2554/802* (2020.02); *B60W 2720/10* (2013.01)
(58) Field of Classification Search
None
See application file for complete search history.

(56) References Cited

U.S. PATENT DOCUMENTS

| | | | |
|---|---|---|---|
| 2004/0195022 A1* | 10/2004 | Inoue | B60K 31/0008 180/170 |
| 2011/0190972 A1* | 8/2011 | Timmons | G08G 1/167 701/31.4 |
| 2017/0274878 A1* | 9/2017 | Fairgrieve | F16H 61/0213 |
| 2018/0001897 A1* | 1/2018 | Brockley | B60W 30/18172 |
| 2018/0236983 A1* | 8/2018 | Moury | B60T 7/042 |
| 2019/0375404 A1* | 12/2019 | Maleki | B60W 40/06 |

FOREIGN PATENT DOCUMENTS

DE        102004013655 A1        11/2004

OTHER PUBLICATIONS

German Office Action from counterpart DE1020241337796, dated Feb. 13, 2025.

* cited by examiner

*Primary Examiner* — Ramon A. Mercado
*Assistant Examiner* — David Ruben Pedersen

(57) ABSTRACT

An example vehicle control system includes a drive unit, an accelerator pedal, a brake pedal, and a vehicle control module configured to automatically control the drive unit to target a cruise control set speed of the vehicle while a cruise control feature of the vehicle is engaged, detect at least one press input parameter associated with the accelerator or brake pedal, including at least one of a length of the accelerator pedal or the brake pedal being pressed, a movement distance of the accelerator pedal or the brake pedal while being pressed, or a number of times the accelerator pedal or the brake pedal is pressed within a specified time period, compare the at least one press input parameter to specified cruise control adjustment criteria, and in response to the press input parameter satisfying the specified cruise control adjustment criteria, adjust the cruise control set speed.

19 Claims, 7 Drawing Sheets

VEHICLE CONTROL SYSTEMS FOR ADJUSTING CRUISE CONTROL SETTINGS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle control systems for adjusting cruise control settings, including adjusting cruise control set speeds based on pressing an accelerator pedal or brake pedal.

Some vehicles include cruise control features which control power supplied by the motor to target a set speed value for the vehicle. Cruise control settings are typically controlled by a driver pressing physical buttons or switches on a steering wheel of the vehicle.

SUMMARY

An example vehicle control system for adjusting cruise control settings includes a drive unit configured to supply power to rotate wheels of a vehicle, an accelerator pedal configured to increase acceleration of the vehicle via the drive unit, in response to the accelerator pedal being pressed by a driver of the vehicle, a brake pedal configured to slow rotation of the wheels of the vehicle, in response to the accelerator pedal being pressed by the driver of the vehicle, and a vehicle control module configured to automatically control the drive unit to target a cruise control set speed of the vehicle while a cruise control feature of the vehicle is engaged, detect at least one press input parameter associated with the accelerator pedal or the brake pedal, wherein the at least one press input parameter includes at least one of a length of the accelerator pedal or the brake pedal being pressed, a movement distance of the accelerator pedal or the brake pedal while being pressed, or a number of times the accelerator pedal or the brake pedal is pressed within a specified time period, compare the at least one press input parameter to specified cruise control adjustment criteria, and in response to the press input parameter satisfying the specified cruise control adjustment criteria, adjust the cruise control set speed.

In some examples, adjusting the cruise control set speed includes modifying power supplied by the drive unit to increase or decrease a rotation speed of the wheels of the vehicle.

In some examples, the vehicle control module is configured to adjust the cruise control set speed without receiving an input at a steering wheel of the vehicle, without receiving an input at a lever of a steering column of the vehicle, and without receiving a voice command input.

In some examples, the vehicle control module is configured to increase the cruise control set speed in response to detecting the at least one press input parameter at the accelerator pedal.

In some examples, the vehicle control module is configured to determine a rate of deceleration of the vehicle, compare the rate of deceleration to a specified deceleration threshold, and change the cruise control set speed to a current speed of the vehicle in response to the rate of deceleration being less than the specified deceleration threshold for a specified time period.

In some examples, the vehicle control module is configured to obtain a current value of the cruise control set speed, obtain a current vehicle speed value, and in response to the current vehicle speed value being less than the current value of the cruise control set speed, change the cruise control set speed to the current vehicle speed value plus a specified offset.

In some examples, the vehicle control module is configured to decrease the cruise control set speed in response to detecting the at least one press input parameter at the brake pedal.

In some examples, the vehicle control module is configured to determine a rate of acceleration of the vehicle, compare the rate of acceleration to a specified acceleration threshold, and change the cruise control set speed to a current speed of the vehicle in response to the rate of acceleration being greater than the specified acceleration threshold for a specified time period.

In some examples, the vehicle control module is configured to obtain a current value of the cruise control set speed, obtain a current vehicle speed value, and in response to the current vehicle speed value being greater than the current value of the cruise control set speed, change the cruise control set speed to the current vehicle speed value minus a specified offset.

In some examples, the system includes at least one front vehicle camera configured to obtain images capturing at least a portion of a front field of view of the vehicle.

In some examples, the vehicle control module is configured to detect a distance between the vehicle and a target object ahead of the vehicle in a same lane as the vehicle, via the at least one front vehicle camera, obtain a current acceleration value of the vehicle, obtain a current speed value of the vehicle, and in response to the current acceleration value being less than a specified acceleration threshold for a specified time period, and the distance being greater than a specified distance threshold, automatically change the cruise control set speed to the current speed value of the vehicle.

In some examples, the vehicle control module is configured to inhibit automatically change the cruise control set speed in response to at least one of a distance between the vehicle and a target object ahead of the vehicle being less than a specified distance threshold, a lateral acceleration value of the vehicle or a longitudinal acceleration value of the vehicle being less than a specified acceleration threshold, a current speed value of the vehicle being below a speed threshold, a cruise control disengage event occurring within a specified time period, a cruise control feature being disabled, a cruise control resume request being currently active.

In some examples, the vehicle control module is configured to detect a disengagement of cruise control based on a press of the brake pedal while the at least one front vehicle camera does not detect a target object within a specified distance threshold in front of the vehicle, subsequent to disengagement of cruise control, detect a target object within the specified distance threshold while the brake pedal is pressed, and in response to release of the brake pedal by the driver, engage the cruise control of the vehicle.

In some examples, the vehicle control module is configured to identify that vehicle cruise control is enabled but not currently engaged, obtain a current steering angle of the vehicle, obtain a current longitudinal acceleration of the vehicle, and in response to the current steering angle being less than a specified curve threshold and the current longitudinal acceleration being greater than a specified acceleration threshold for a specified time period, automatically engage vehicle cruise control, obtain a disengagement of cruise control based on a press of the brake pedal while at least one front vehicle camera does not detect a target object within a specified distance threshold in front of the vehicle, subsequent to disengagement of cruise control, detect a target object within the specified distance threshold while the brake pedal is pressed, and in response to release of the brake pedal by the driver, engage the cruise control of the vehicle.

An example method for adjusting vehicle cruise control settings, the method comprising automatically controlling, by a vehicle control module, a drive unit of a vehicle to target a cruise control set speed of the vehicle while a cruise control feature of the vehicle is engaged, detecting at least one press input parameter associated with an accelerator pedal of the vehicle or a brake pedal of the vehicle, wherein the at least one press input parameter includes at least one of a length of the accelerator pedal or the brake pedal being pressed, a movement distance of the accelerator pedal or the brake pedal while being pressed, or a number of times the accelerator pedal or the brake pedal is pressed within a specified time period, comparing the at least one press input parameter to specified cruise control adjustment criteria, and in response to the press input parameter satisfying the specified cruise control adjustment criteria, adjusting the cruise control set speed.

In some examples, adjusting the cruise control set speed includes modifying power supplied by the drive unit to increase or decrease a rotation speed of wheels of the vehicle.

In some examples, the method includes adjusting the cruise control set speed without receiving an input at a steering wheel of the vehicle, without receiving an input at a lever of a steering column of the vehicle, and without receiving a voice command input.

In some examples, the method includes increasing the cruise control set speed in response to detecting the at least one press input parameter at the accelerator pedal.

In some examples, the method includes determining a rate of deceleration of the vehicle, comparing the rate of deceleration to a specified deceleration threshold, and changing the cruise control set speed to a current speed of the vehicle in response to the rate of deceleration being less than the specified deceleration threshold for a specified time period.

In some examples, the method includes obtaining a current value of the cruise control set speed, obtaining a current vehicle speed value, and in response to the current vehicle speed value being less than the current value of the cruise control set speed, changing the cruise control set speed to the current vehicle speed value plus a specified offset.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

4

Figure 3:
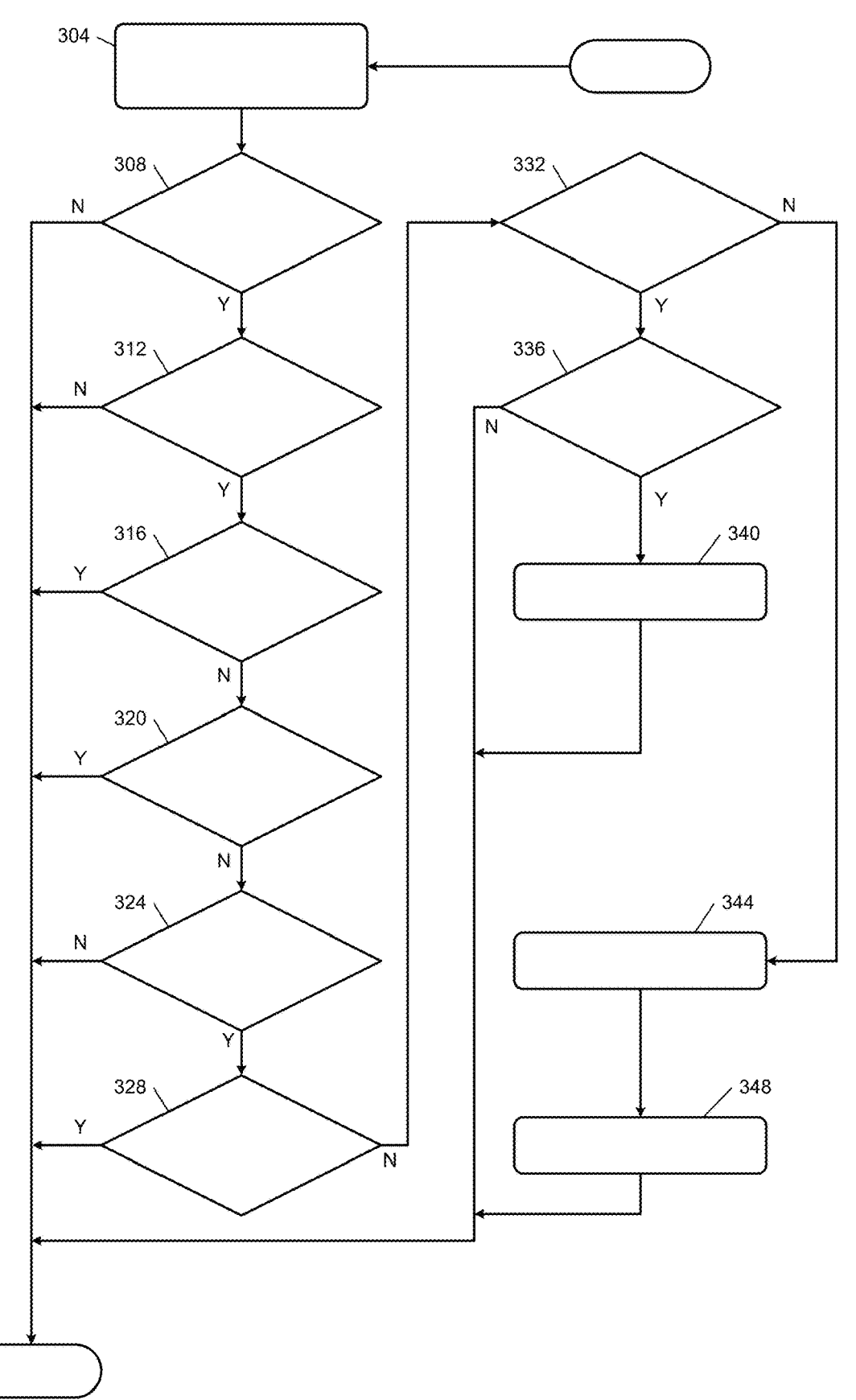

FIG. 3 is a flowchart depicting an example process for automatically setting a cruise control speed based on a sensed distance to a target lead vehicle.

Figure 4:
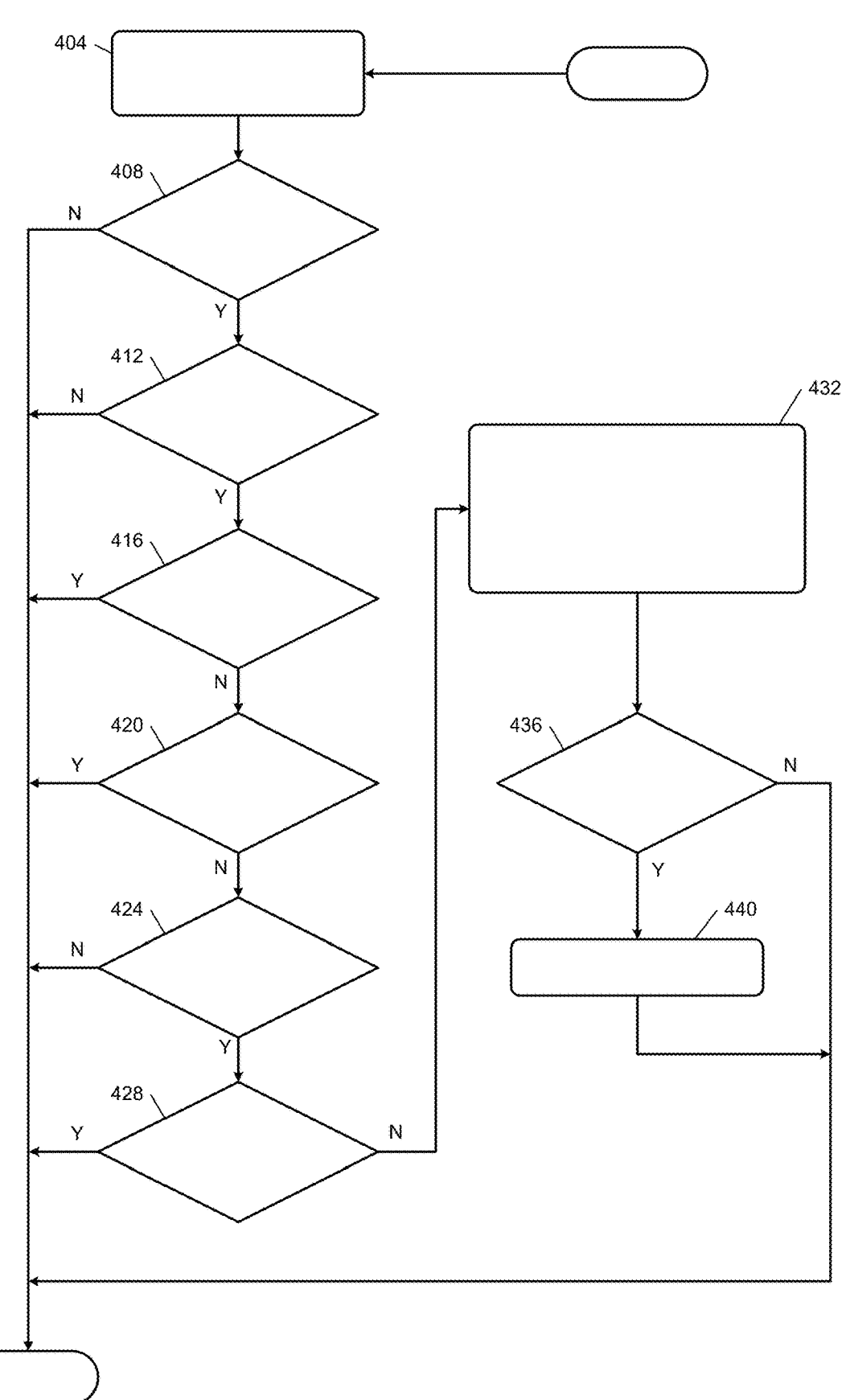

FIG. 4 is a flowchart depicting an example process for automatically engaging a cruise control feature based on target lead vehicle recognition.

Figure 5:
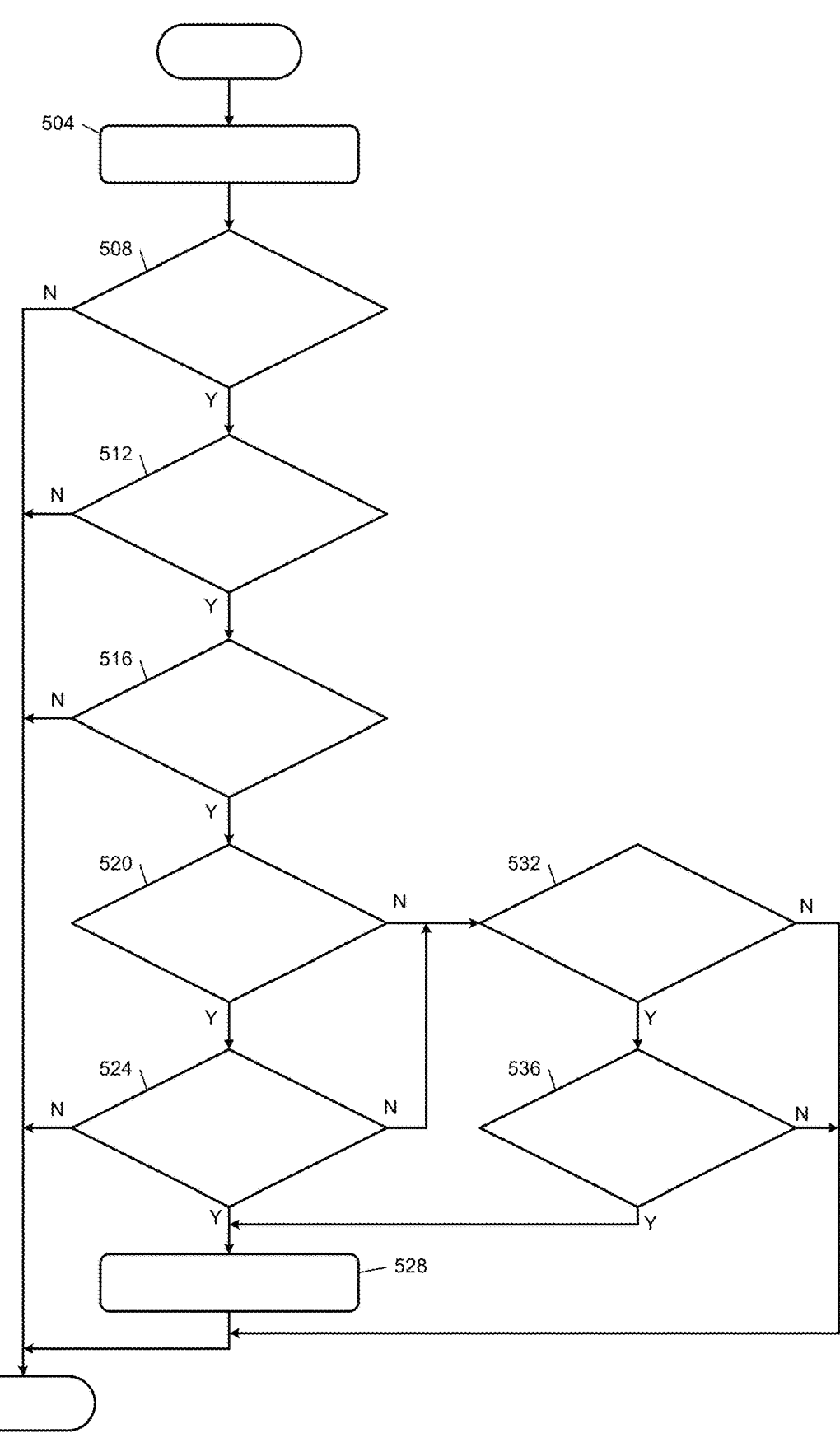

FIG. 5 is a flowchart depicting an example process for automatically engaging a cruise control feature based on sensed vehicle movement parameters.

Figure 6:
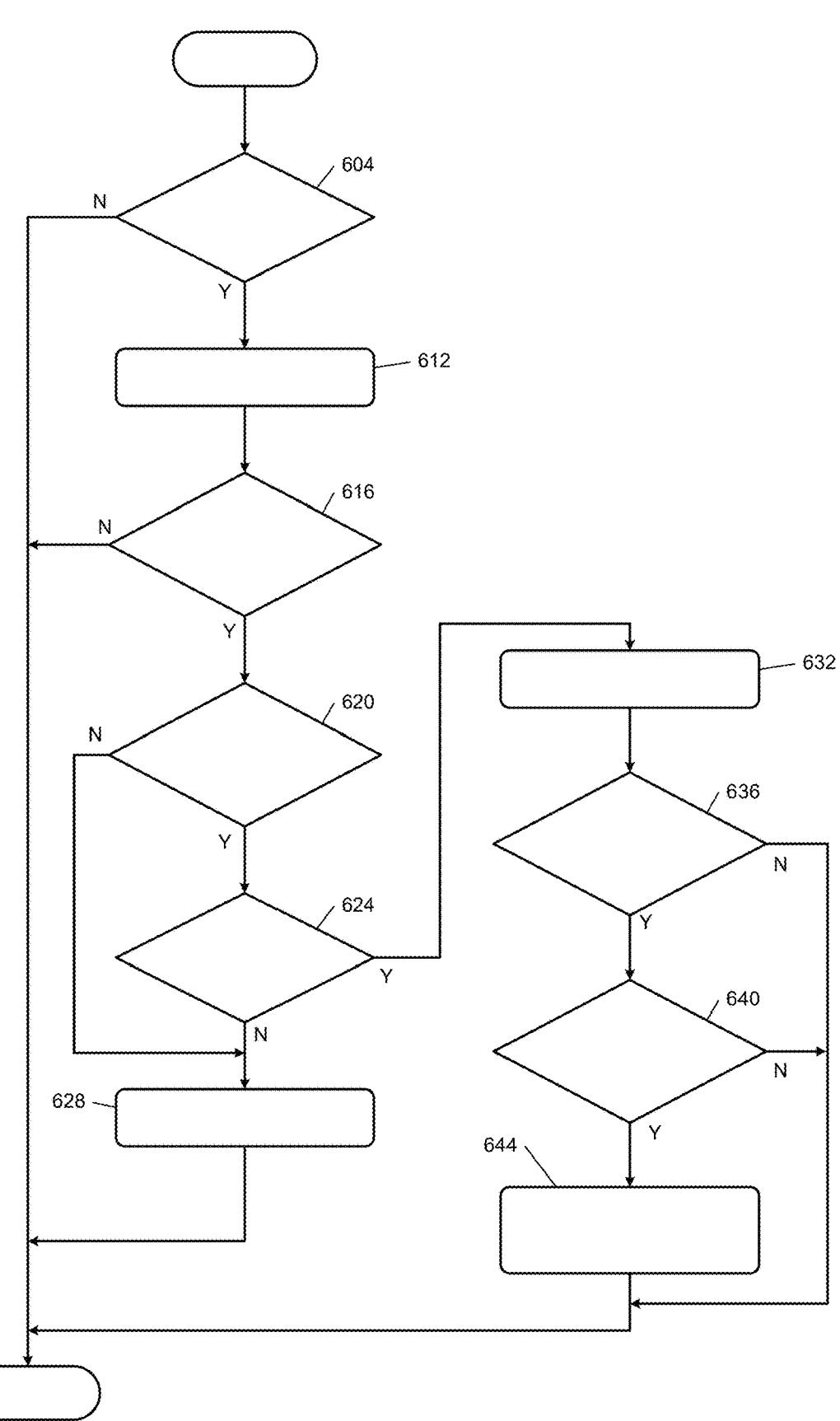

FIG. 6 is flowchart depicting an example process for automatically increasing a cruise control set speed based on input to an accelerator pedal.

Figure 7:
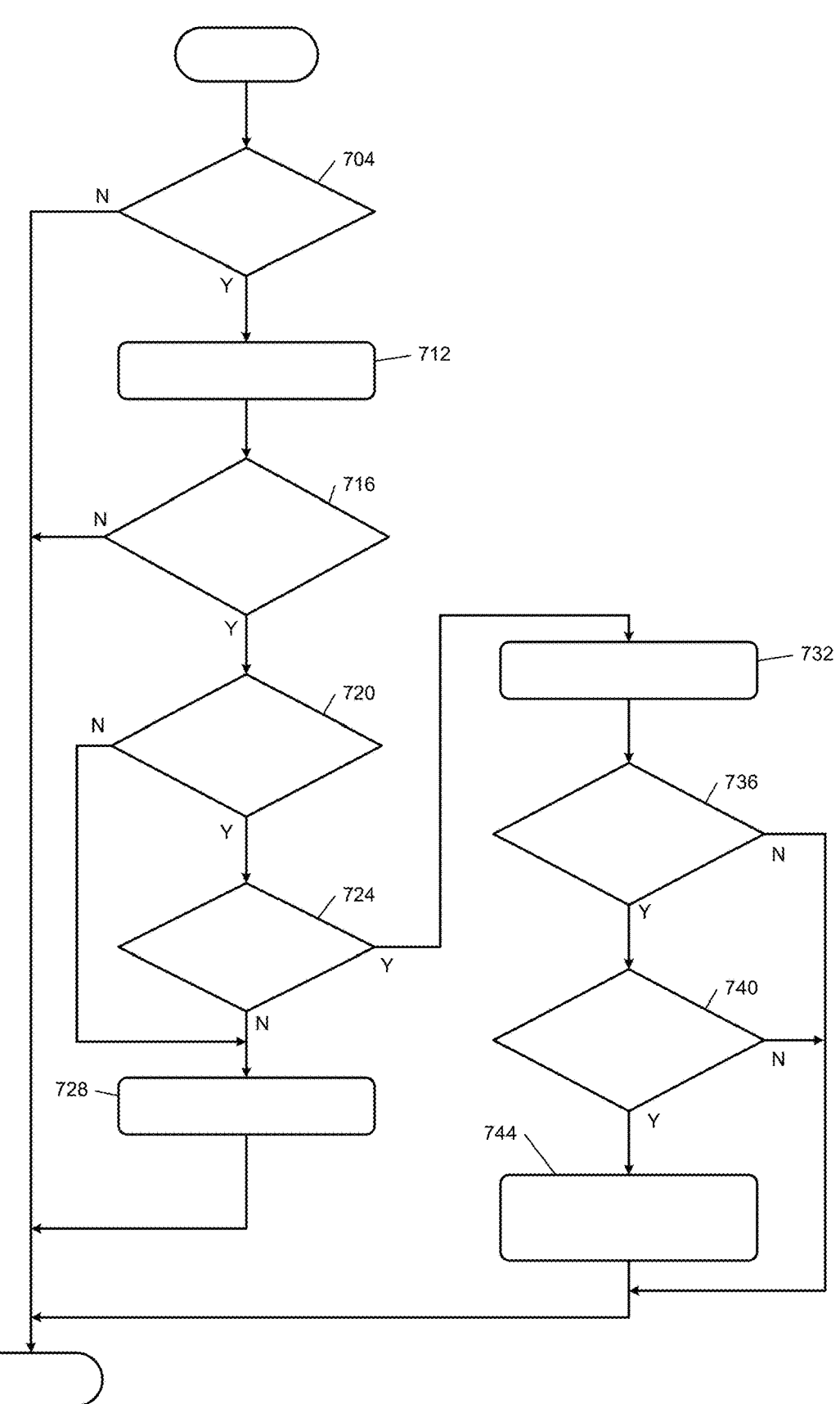

FIG. 7 is flowchart depicting an example process for automatically decreasing a cruise control set speed based on input to a brake pedal.

In the drawings, reference numbers may be reused to identify similar and/or identical elements.

DETAILED DESCRIPTION

Some example embodiments described herein allow drivers to control cruise control features without physically pressing buttons or switches on a steering wheel. Any suitable cruise control implementations may be used, such as adaptive cruise control (ACC) where a host vehicle maintains a speed or distance relative to a lead vehicle in front of the host vehicle, conventional cruise control where the vehicle targets a set speed value to maintain by varying power supplied by a motor, etc.

In some examples, a vehicle control module may facilitate control and adjustment of various cruise control features, without requiring input at buttons of the steering wheel, input at levers of the steering column, or voice commands. This may be referred to as "virtual cruise control," where cruise control operations are set or adjusted based on accelerator pedal input parameters, brake pedal input parameters, sensed speed or acceleration history of the vehicle, sensed distance to a lead vehicle ahead of the host vehicle on the road, etc.

For example, the vehicle control module may be configured to engage cruise control automatically at a current vehicle speed when specified criteria are met, such as a steering angle of the vehicle being withing a specified curve threshold, a current speed of the vehicle being over a minimum engagement speed threshold, an acceleration of the vehicle being above a specified acceleration threshold for a specified time period, etc. The vehicle control module may automatically resume to a cruise control set speed, from a different current vehicle speed, based on specified criteria as described further below.

In some examples, accelerator pedal and/or brake pedal input may be used to change settings of the cruise control features. For example, while the cruise control is engaged at a set speed, the vehicle control module may automatically increase the set speed in response to an accelerator pedal tap event. The accelerator pedal tap event may include any suitable input parameters that satisfy specified event criteria, such as the driver pressing the accelerator pedal for less than a specified time period (e.g., less than 500 milliseconds, less than one second, etc.), the driver pressing the accelerator pedal a specified distance and releasing the pedal (e.g., less than 10% of full accelerator pedal engagement, less than 50% of full accelerator pedal engagement, etc.), the driver pressing the accelerator pedal in a specified sequence (e.g., two press and release events within two seconds, three press and release events within five seconds, etc.).

As another example, while the cruise control is engaged at a set speed, the vehicle control module may automatically decrease the set speed in response to a brake pedal tap event. The brake pedal tap event may include any suitable input parameters that satisfy specified event criteria, such as the driver pressing the brake pedal for less than a specified time period (e.g., less than 500 milliseconds, less than one second, etc.), the driver pressing the brake pedal a specified distance and releasing the pedal (e.g., less than 10% of full brake pedal engagement, less than 50% of full brake pedal engagement, etc.), the driver pressing the brake pedal in a specified sequence (e.g., two press and release events within two seconds, three press and release events within five seconds, etc.).

The vehicle control module may be configured to adjust a cruise control set speed in response to an accelerator pedal override (APO) event. For example, the vehicle control module may adjust the cruise control set speed to a current speed of the vehicle in response to an accelerator pedal override event exceeding a specified time period (e.g., the driver holding down the accelerator pedal to maintain vehicle speed above a current cruise control set speed for at least five seconds, at least ten seconds, etc.).

Some features may be associated with an adaptive cruise control mode which relies on a front vehicle camera, laser, lidar, etc., to detect object in front of the vehicle. For example, if the driver disengages cruise control by pressing the brake pedal when the vehicle control module does not recognize any lead vehicles within a specified distance of the host vehicle (e.g., no lead vehicles within 100 feet of the host vehicle, etc.), and the vehicle control module subsequently recognizes a lead vehicle ahead of the host vehicle, the vehicle control module may automatically resume a set speed of the cruise control (or reenable cruise control) without requiring input from the driver.

Each of the features described herein may be independently enabled by the driver, or have calibration settings adjusted by the driver. For example, a driver may enable accelerator pedal tap up events to increase cruise control set speeds, while disabling brake pedal tap down events if the driver always wants brake pedal touches to completely disengage cruise control. The driver may be able to modify timing for activating accelerator pedal tap up or brake pedal tap down inputs, acceleration and speed thresholds or time periods for automatically reengaging cruise control or modifying a cruise control set speed, etc.

Example embodiments may provide one or more benefits for drivers, such as providing conditional logic for modifying cruise control settings that is simple, light, intuitive and accessible, using predicable and repeatable control features. Example embodiments may facilitate intuitive, subconscious interaction with the cruise control system which reduces a decision-making burden on the driver.

In some examples, automated control of the cruise control features may not require any additional sensing, perception, mapping or path planning technology, and may reduce or eliminate a mental burden of hand-foot coordination to manage vehicle speed and a physical burden of pressing buttons.

Example implementations described herein may be used in any suitable road scenarios, such as a driver braking for objects or activity in a lane or near the vehicle (e.g., a pedestrian, a pothole, a speedbump, a road railroad crossing, construction, an emergency vehicle, a school bus, or nice scenery), a driver braking to traverse an intersection (e.g., to travel straight, for a right turn, for a left turn, for a U-turn, for a Michigan left, or a roundabout), a driver braking for a cut-in maneuver, a cut-out revealing actor, changing, lanes, merging, etc.

Some other example road scenarios may include a driver that does not have adaptive cruise control in a vehicle, or forgot that adaptive cruise control will brake for, or did not feel like the adaptive cruise control was breaking as much as they wanted (e.g., due to a curve in the road, an object entering the driving path, an object exiting the driving path, etc.), or a change in speed limit or a change in a driver's desired speed. As mentioned above, example embodiments may facilitate changes to cruise control settings without the driver having to touch any steering wheel buttons.

Figure 1:
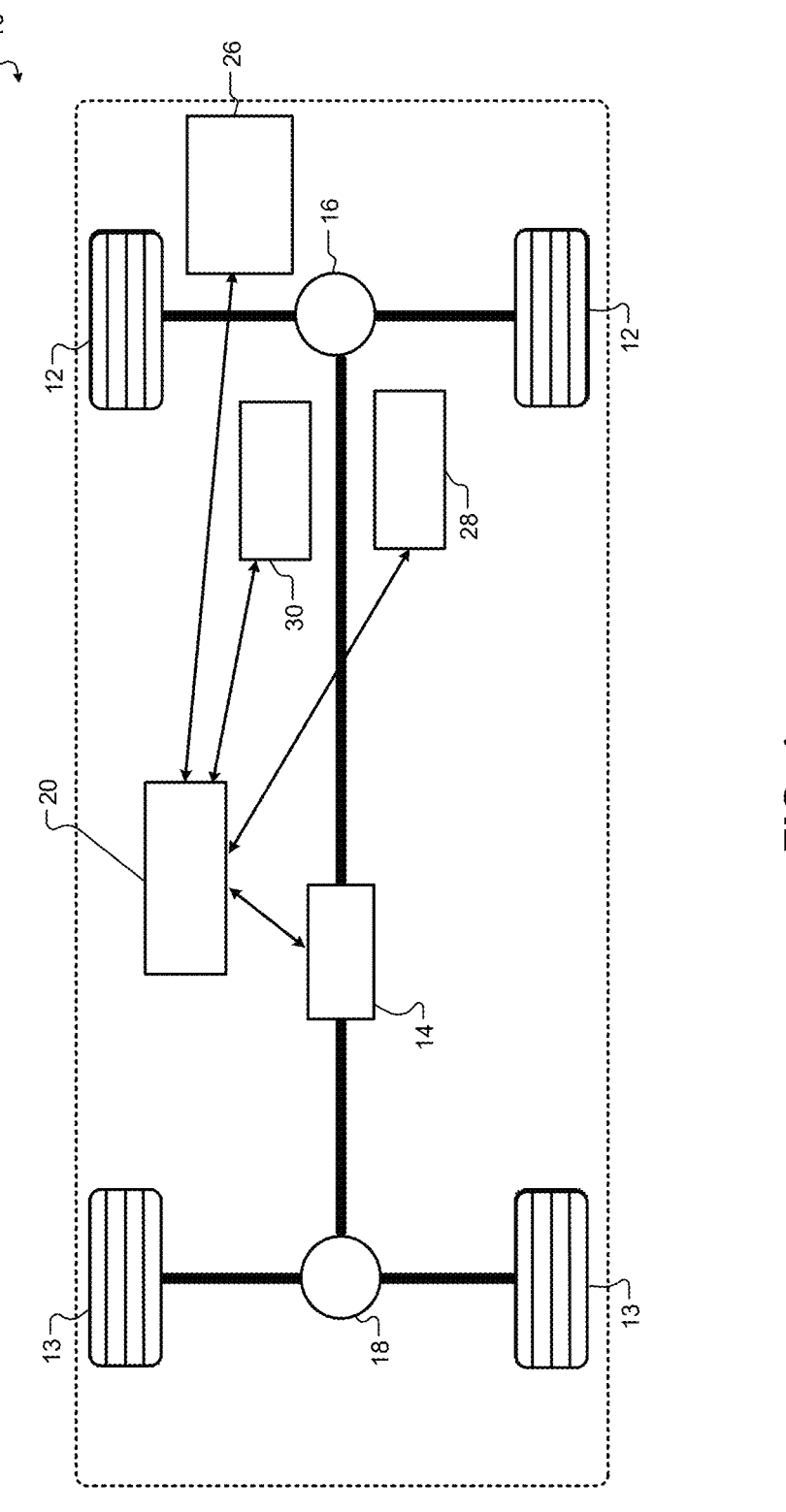
FIG. 1 is a diagram of an example vehicle including an accelerator pedal and brake pedal for adjusting cruise control set speeds.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an accelerator pedal, a brake pedal, a vehicle camera, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, wheel position sensors, location sensors such as global positioning system (GPS) antennas, etc.). Some sensors may be configured to monitor current motion of the vehicle, acceleration of the vehicle, steering torque, etc.

As shown in FIG. 1, the vehicle 10 includes a front vehicle camera 26, configured to capture images of a field of view in front of the vehicle 10. The field of view may be a wide field of view (such as a least a thirty degree field of view, a forty-five degree field of view, a sixty degree field of view, a ninety degree field of view, etc.), in order to capture objects on sides of a road on which the vehicle 10 is traveling. In various implementations, the vehicle 10 may include more or less front vehicle cameras, optional side or rear vehicle cameras, etc. The vehicle 10 may include any suitable laser, lidar sensor, etc., which is used to detect objects around the vehicle 10.

In some example embodiments, a vehicle object detector may be configured to detect a closest in-path vehicle (CIPV) (e.g., another vehicle in front of a current driving path of the vehicle 10), a vulnerable road user (VRU) (e.g., a pedestrian or cyclist), etc. The vehicle control module 20 may be configured to control movement of the vehicle 10 based on a detected CIP target vehicle, detected driving behavior of a rear target vehicle, etc., such as by increasing or decreasing automated acceleration of the vehicle 10 (e.g., by controlling power or torque output by a motor), automatically applying brakes of the vehicle 10 (such as in response to a crash imminent braking event), implementing adaptive cruise control or adjusting cruise control settings automatically based on distance to a target vehicle, etc.

As shown in FIG. 1, the vehicle 10 includes an accelerator pedal 28 and a brake pedal 30. The accelerator pedal 28 may be configured to increase acceleration of the vehicle 10 when the accelerator pedal 28 is pressed (e.g., by the driver's foot), such as by increasing power supplied from the drive unit 14 to the front wheels 12 and/or rear wheels 13. The brake pedal 30 may be configured to decrease speed of the vehicle 10 when the brake pedal 30 is pressed (e.g., by the driver's foot), such as by applying brake pads to the front wheels 12 and/or rear wheels 13 to slow rotation of the wheels.

The accelerator pedal 28 and brake pedal 30 may be used to adjust settings of a cruise control system of the vehicle 10. For example, the vehicle control module 20 may be configured to implement cruise control features for the vehicle 10 such as maintaining or attempting to maintain a target speed (e.g., cruise control set speed), by controlling an amount of power supplied by the drive unit 14 to the front wheels 12 and/or rear wheels 13. In some examples, the vehicle control module 20 may be configured to automatically adjust cruise control settings based on input received from the accelerator pedal 28, the brake pedal 30 and/or the front vehicle camera 26, without requiring input from steering wheel buttons, as described further herein.

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

The vehicle 10 also includes a user interface. The user interface may include any suitable displays (such as on a dashboard, a console, or elsewhere), a touchscreen or other input devices, speakers for generation of audio, etc.

Figure 2:
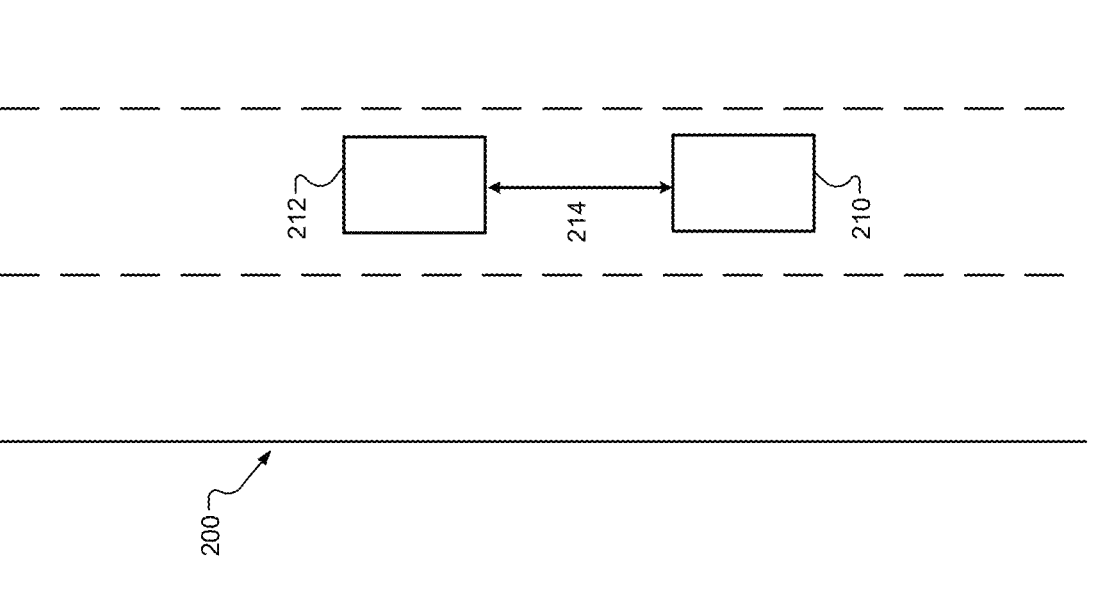
FIG. 2 is an example diagram of a host vehicle following a target vehicle ahead using cruise control.

FIG. 2 is an example diagram of a host vehicle 210 navigating a road 200 using cruise control features. As shown in FIG. 2, the host vehicle 210 may determine a distance 214 between the host vehicle 210 and a lead vehicle 212 ahead of the host vehicle 210 in a same lane.

The host vehicle 210 may be configured to implement adaptive cruise control to maintain or attempt to maintain a set distance 214 between the host vehicle and the lead vehicle 212, such as by controlling a speed of the host vehicle 210 to match a speed of the lead vehicle 212.

FIG. 3 is a flowchart depicting an example process for automatically setting a cruise control speed based on a sensed distance to a target lead vehicle. The process illustrated in FIG. 3 may be performed by, for example, the vehicle control module 20 of FIG. 1. At 304, the process begins by obtaining a distance between a host vehicle and a target vehicle ahead of the host vehicle in the lane.

At 308, the vehicle control module is configured to determine whether the distance between the host vehicle is greater than a specified distance threshold. The specified distance threshold may be indicative of a safe distance between the two cars to activate cruise control (e.g., at least fifty feet, at least one hundred feet, etc.), and may be variable depending on a current speed of the host vehicle.

If the distance is not greater than the specified threshold at 308, control does not engage cruise control or adjust the cruise control set speed. If the distance is greater than the specified threshold at 308, control proceeds to 312 to determine whether a lateral acceleration of the vehicle and a longitudinal acceleration are less than a specified threshold.

For example, the vehicle control module may monitor longitudinal acceleration and lateral acceleration of the host vehicle for a specified time period (e.g., one second, five seconds, twenty seconds, etc.), and check whether the acceleration values are below a threshold indicating that it is safe to activate cruise control. If the acceleration values are greater than the specified threshold at 312, control does not engage cruise control or adjust the cruise control set speed. If the acceleration values are less than the acceleration threshold at 312, control proceeds to 316 to determine whether a velocity of the host vehicle is below a speed threshold.

For example, if the host vehicle is traveling too slow (e.g., less than thirty miles per hour (mph), less than 15 mph, etc.), control may not engage cruise control or set a cruise control for safety reasons. If the host vehicle is traveling above the specified speed threshold at 316, control proceeds to 320 to determine whether a driver has recently disengaged cruise control.

If the driver has recently disengaged cruise control (e.g., within a last three seconds, within a last ten seconds, etc.), control may not reactivate cruise control to avoid bothering the driver or overriding recent driver intentions. If the driver has not recently disengaged cruise control at 320, control proceeds to 324 to determine whether the cruise control feature has been enabled for the vehicle.

If the cruise control feature is not enabled at 324, the process ends. If cruise control is enabled at 324, control determines whether a resume request is active. For example, if the driver has already entered a request to resume cruise control, the process may end and allow the request to be executed.

If a resume request is not currently active at 328, control proceeds to 332 to determine whether cruise control is currently engaged. If not, the vehicle control module is configured to change the cruise control set speed to a current speed of the vehicle at 344. Control then engages cruise control at 348. In this case, if a distance between the host vehicle and lead vehicle is above the threshold, host vehicle acceleration and speed values are within specified criteria ranges indicating that activation of cruise control would be safe, and there are no current cruise control settings taking priority, the vehicle control module may be configured to automatically engage and set a speed of the cruise control based on a current speed of the vehicle. This may occur automatically without requiring a button press input from the driver, for example.

If control determines at 332 that the cruise control feature is already engaged, control proceeds to 336 to determine whether the current vehicle speed is above the cruise control set speed by a specified threshold value (e.g., at least three mph above the cruise control set speed, at least five mph above the current control set speed, etc.). If not, control does not make any changes to the cruise control set speed.

If the current vehicle speed is above the cruise control set speed by the specified threshold at 336, control proceeds to 340 the change the cruise control set speed to the current speed of the vehicle. The speed may need to stay above the specified threshold for a defined period of time (e.g., at least three seconds, at least ten seconds, etc.) before the cruise control set speed is adjusted. In this example case, a driver may change the cruise control set speed automatically by driving a specified amount over the current set speed, without requiring any input to steering wheel buttons, etc.

In some examples, virtual automatic engagement of the cruise control settings or set speed may be based on one or more conditions, such as the host vehicle being sufficiently far from the detected vehicle ahead, lateral acceleration of the host vehicle being low enough for long enough, longitudinal acceleration of the host vehicle being low enough for long enough, velocity of the host vehicle being high enough, confirming that the driver has not recently disengaged cruise control via a brake pedal or cancel switch, confirming that a virtual resume request is not currently active, and confirming that a cruise control feature is enabled but not engaged.

The virtual automatic engagement of cruise control may result in cruise control transitions from a disengaged state to an engaged state, setting a cruise control set speed to a current speed of the vehicle, etc. In some examples, the vehicle control module may be configured to adjust a cruise control set speed to a current vehicle speed in response to an extended accelerator pedal override event, such as the driver pressing the accelerator pedal for specified time period to bring a current speed of the vehicle above the cruise control set speed by a specified amount.

FIG. 4 is a flowchart depicting an example process for automatically engaging a cruise control feature based on target lead vehicle recognition. The process illustrated in FIG. 4 may be performed by, for example, the vehicle control module 20 of FIG. 1. At 404, the process begins by obtaining a distance between a host vehicle and a target vehicle ahead of the host vehicle in the lane.

At 408, the vehicle control module is configured to determine whether the distance between the host vehicle is greater than a specified distance threshold. The specified distance threshold may be indicative of a safe distance between the two cars to activate cruise control (e.g., at least fifty feet, at least one hundred feet, etc.), and may be variable depending on a current speed of the host vehicle.

If the distance is not greater than the specified threshold at 408, control does not engage cruise control or adjust the cruise control set speed. If the distance is greater than the specified threshold at 408, control proceeds to 412 to determine whether a lateral acceleration of the vehicle and a longitudinal acceleration are less than a specified threshold.

If the acceleration values are greater than the specified threshold at 412, control does not engage cruise control or adjust the cruise control set speed. If the acceleration values are less than the acceleration threshold at 412, control proceeds to 416 to determine whether a velocity of the host vehicle is below a speed threshold. If the host vehicle is traveling above the specified speed threshold at 416, control proceeds to 420 to determine whether a driver has recently disengaged cruise control.

If the driver has not recently disengaged cruise control at 420, control proceeds to 424 to determine whether the cruise control feature has been enabled for the vehicle. If the cruise control feature is not enabled at 424, the process ends. If cruise control is enabled at 424, control determines whether cruise control is currently engaged at 428.

If cruise control is not engaged at 428, control proceeds to 432 to determine whether a specified sequence of events has occurred. For example, control may determine whether a driver pressed the brake pedal while the cruise control system did not detect any forward objects (e.g., because the driver sensed a potential threat object that was not recognized by the adaptive cruise control system and front vehicle camera). If so, and control subsequently detects an object while the driver is still pressing the brake pedal (which may be referred to as late object recognition by the cruise control system), control then checks whether the driver releases the brake or stops the vehicle.

If the above sequence occurs at 436, control may engage cruise control automatically at 440. In this case, when the cruise control system recognizes a target object after the driver has already pressed the brake pedal on their own, control may reengage cruise control after the driver has released the brake pedal.

In some examples, virtual automatic cruise control resume after late object recognition may be based on one or more conditions, such as the host vehicle being sufficiently far from the detected vehicle ahead, lateral acceleration of the host vehicle being low enough for long enough, longitudinal acceleration of the host vehicle being low enough for long enough, velocity of the host vehicle being high enough, confirming that the driver has not recently disengaged cruise control via a brake pedal or cancel switch, and confirming that a cruise control feature is enabled but not engaged.

Control may determine whether a specified sequence of events has occurred, such as the driver recently disengaging cruise control by pressing the brake pedal when the cruise control feature did not detect an object ahead, the cruise control features then recognizing an object ahead while the driver is still pressing the brake pedal, and the driver subsequently releasing the brake pedal or coming to a stop. The vehicle control module may be configured to the automatically engage cruise control without requiring driver input, and set the cruise control set speed to a value before cruise control was disengaged via the brake pedal.

FIG. 5 is a flowchart depicting an example process for automatically engaging a cruise control feature based on sensed vehicle movement parameters. The process illustrated in FIG. 5 may be performed by, for example, the vehicle control module 20 of FIG. 1. At 504, the process begins by obtaining a history of cruise control states, such as recent engagement of cruise control or disengagement of cruise control, recent enablement or disablement of cruise control, etc.

At 508, control determines whether cruise control has transitioned from enabled to engaged since it was last disabled. If so, control proceeds to 512 to determine whether the driver has recently disengaged cruise control via pressing the brake pedal or using a cancel button (e.g., on a steering wheel).

If the driver has recently disengaged the cruise control at 512, control proceeds to 516 to determine whether the cruise control feature is currently enabled but not engaged. If so, control proceeds to 520 to determine whether a driver-intended curvature and curvature rate is less than a specified threshold (e.g., for at least a specified period of time). For example, control may determine whether a steering angle of the vehicle, etc., is close enough to straight to safely activate cruise control.

If the driver-intended curvature and curvature rate is within a threshold at 520, control proceeds to 524 to determine whether a driver-intended longitudinal acceleration is greater than a threshold (e.g., for at least a specified period of time). For example, control may determine whether the driver is pressing an accelerator pedal in an attempt to increase a speed of the vehicle. If so, control proceeds to 528 to automatically engage the cruise control, without requiring further input from the driver.

If control determines that curvature of the vehicle is too high at 520, or that longitudinal acceleration is too low at 524, control proceeds to 532 to determine whether a difference between a filtered cruise control internal set speed (e.g., an internal set speed of an adaptive cruise control system) and an unfiltered cruise control internal set speed is less than a threshold. If so, control proceeds to 536 to determine whether a current velocity of the vehicle is above an internal set speed by a threshold amount. If so, control proceeds to 528 to automatically engage cruise control.

In some examples, the vehicle control module may be configured to automatically implement a virtual resume to set speed based on one or more conditions, such as a virtual resume to set speed feature being enabled, a cruise control feature having transitioned from enabled to engaged at least once since the driver or system last disabled cruise control, confirming that the driver has not recently disengaged cruise control via the brake pedal or a cancel switch, and confirming that the cruise control feature is enabled but not engaged.

The vehicle control module may confirm that either the driver has completed a braking and/or turning maneuver, or a driver's speed exceeds the internal set speed of an adaptive cruise control system. If so, the vehicle control module may automatically engage cruise control and set the speed to a value when cruise control was last disengaged.

The vehicle control module may be configured to determine whether the driver has completed a braking and/or turning maneuver in any suitable manner, such as determining whether driver intended longitudinal acceleration is high enough for long enough, whether curvature of motion of the vehicle is low enough for long enough, and whether a curvature rate of motion of the vehicle is low enough for long enough. The vehicle control module may be configured to determine whether a driver's speed exceeds an internal set speed of adaptive cruise control in any suitable manner, such as determining whether an ACC internal set speed is stable (e.g., a difference between the filtered and unfiltered ACC internal set speed is low enough for long enough), and whether vehicle velocity is above the ACC internal set speed.

FIG. 6 is flowchart depicting an example process for automatically increasing a cruise control set speed based on input to an accelerator pedal. The process illustrated in FIG. 6 may be performed by, for example, the vehicle control module 20 of FIG. 1. At 604, the process begins by determining whether virtual tap up is enabled (e.g., whether a driver or the system has enabled the ability to increase cruise control set speeds using the accelerator pedal).

If so, control detects accelerator pedal input at 612 (e.g., whether a driver is pressing the accelerator pedal). At 616, control determines whether the accelerator pedal input matches tap up criteria. For example, and as described further above, control may determine whether parameters associated with the accelerator input (e.g., press duration, distance of pedal press, number of pedal presses in sequence within a time period, etc.), match defined criteria for adjusting cruise control set speed.

If the accelerator pedal input satisfies the criteria at 616, control proceeds to 620 to determine whether a virtual tap to set feature is enabled. For example, a virtual tap to set feature may indicate whether a driver is allowed to set a new cruise control speed using the accelerator pedal (e.g., as opposed to simply increasing the set speed by a specified amount).

If the virtual tap to set feature is not enabled at 620, control proceeds to 628 to increase the cruise control set speed by a specified amount (e.g., two mph, five mph, etc.). If the virtual tap to set feature is enabled at 620, control proceeds to 624 to determine whether the vehicle is decelerating at a rate greater than a threshold. If not, control proceeds to 628 to increase the cruise control set speed by the specified amount.

If the vehicle is decelerating at a rate greater than a threshold at 624 (e.g., the vehicle is slowing down a lot), control proceeds to 632 to change the cruise control set speed to a current speed of the vehicle. Control then proceeds to 636 to determine whether a setting is enabled for virtual set to higher than current speed (e.g., to allow a driver to specify a cruise control set speed above a current speed).

If the feature is enabled at 636, control proceeds to 640 to determine whether the vehicle speed is less than a current cruise control set speed. If so, control changes the cruise control set speed to a current speed of the vehicle plus an additional specified amount (e.g., an additional two mph, an additional five mph, etc.).

In some examples, the vehicle control module may be configured to implement virtual tap-up of the cruise control settings based on any suitable conditions, such as cruise control being engaged, and a specific accelerator input (e.g., specific pattern of input) being detected. In various implementations, if the vehicle is accelerating, or decelerating a small amount, the cruise control set speed increases a predetermined amount in response to an accelerator tap up. If the vehicle is decelerating significantly, the cruise control set speed changes to the current speed in response to the accelerator pedal tap up input. If the vehicle is decelerating significantly and the vehicle speed is lower than the current set speed, then the cruise control set speed changes to the current speed plus a predetermined amount in response to the accelerator pedal tap up input.

FIG. 7 is flowchart depicting an example process for automatically decreasing a cruise control set speed based on input to a brake pedal. The process illustrated in FIG. 7 may be performed by, for example, the vehicle control module 20 of FIG. 1. At 704, the process begins by determining whether virtual tap down is enabled (e.g., whether a driver or the system has enabled the ability to decrease cruise control set speeds using the brake pedal).

If so, control detects brake pedal input at 712 (e.g., whether a driver is pressing the brake pedal). At 716, control determines whether the brake pedal input matches tap down criteria. For example, and as described further above, control may determine whether parameters associated with the brake input (e.g., press duration, distance of pedal press, number of pedal presses in sequence within a time period, etc.), match defined criteria for adjusting cruise control set speed.

If the brake pedal input satisfies the criteria at 716, control proceeds to 720 to determine whether a virtual to set feature is enabled. For example, a virtual tap to set feature may indicate whether a driver is allowed to set a new cruise control speed using the brake pedal (e.g., as opposed to simply decreasing the set speed by a specified amount).

If the virtual tap to set feature is not enabled at 720, control proceeds to 728 to decrease the cruise control set speed by a specified amount (e.g., two mph, five mph, etc.). If the virtual tap to set feature is enabled at 720, control proceeds to 724 to determine whether the vehicle is accelerating at a rate greater than a threshold. If not, control proceeds to 728 to decrease the cruise control set speed by the specified amount.

If the vehicle is accelerating at a rate greater than a threshold at 724 (e.g., the vehicle is speeding up a lot), control proceeds to 732 to change the cruise control set speed to a current speed of the vehicle. Control then proceeds to 736 to determine whether a setting is enabled for virtual set to lower than current speed (e.g., to allow a driver to specify a cruise control set speed below a current speed).

If the feature is enabled at 736, control proceeds to 740 to determine whether the vehicle speed is greater than a current cruise control set speed. If so, control changes the cruise control set speed to a current speed of the vehicle minus an additional specified amount (e.g., an additional two mph, an additional five mph, etc.).

In some examples, the vehicle control module may be configured to implement virtual tap-down of the cruise control settings based on any suitable conditions, such as cruise control being engaged, and a specific brake pedal input (e.g., specific pattern of input) being detected. In various implementations, if the vehicle is decelerating, or accelerating a small amount, the cruise control set speed decreases a predetermined amount in response to the brake pedal tap down input. If the vehicle is accelerating significantly, the cruise control set speed changes to the current speed in response to the brake pedal tap down input. If the vehicle is accelerating significantly and the vehicle speed is higher than the current set speed, then the cruise control set speed changes to the current speed minus a predetermined amount in response to the brake pedal tap down input.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Per, Pascal, Curd, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle control system for adjusting cruise control settings, the vehicle control system comprising:
a drive unit configured to supply power to rotate wheels of a vehicle;
an accelerator pedal configured to increase acceleration of the vehicle via the drive unit, in response to the accelerator pedal being pressed by a driver of the vehicle;
a brake pedal configured to slow rotation of the wheels of the vehicle, in response to the brake pedal being pressed by the driver of the vehicle; and
a vehicle control module configured to:
automatically control the drive unit to target a cruise control set speed of the vehicle while a cruise control feature of the vehicle is engaged;
detect at least one press input parameter associated with the accelerator pedal or the brake pedal, wherein the at least one press input parameter includes at least one of a length of the accelerator pedal or the brake pedal being pressed, a movement distance of the accelerator pedal or the brake pedal while being pressed, or a number of times the accelerator pedal or the brake pedal is pressed within a specified time period;
compare the at least one press input parameter to specified cruise control adjustment criteria;
in response to the press input parameter satisfying the specified cruise control adjustment criteria, adjust the cruise control set speed
identify that vehicle cruise control is enabled but not currently engaged;
obtain a current steering angle of the vehicle;
obtain a current longitudinal acceleration of the vehicle;
in response to the current steering angle being less than a specified curve threshold and the current longitudinal acceleration being greater than a specified acceleration threshold for a specified time period, automatically engage vehicle cruise control;
obtain a disengagement of cruise control based on a press of the brake pedal while at least one front vehicle camera does not detect a target object within a specified distance threshold in front of the vehicle;
subsequent to disengagement of cruise control, detect a target object within the specified distance threshold while the brake pedal is pressed; and
in response to release of the brake pedal by the driver, engage the cruise control of the vehicle.

2. The vehicle control system of claim 1, wherein adjusting the cruise control set speed includes modifying power supplied by the drive unit to increase or decrease a rotation speed of the wheels of the vehicle.

3. The vehicle control system of claim 1, wherein the vehicle control module is configured to adjust the cruise control set speed without receiving an input at a steering wheel of the vehicle, without receiving an input at a lever of a steering column of the vehicle, and without receiving a voice command input.

4. The vehicle control system of claim 1, wherein the vehicle control module is configured to increase the cruise control set speed in response to detecting the at least one press input parameter at the accelerator pedal.

5. The vehicle control system of claim 4, wherein the vehicle control module is configured to:
determine a rate of deceleration of the vehicle;
compare the rate of deceleration to a specified deceleration threshold; and
change the cruise control set speed to a current speed of the vehicle in response to the rate of deceleration being less than the specified deceleration threshold for a specified time period.

6. The vehicle control system of claim 4, wherein the vehicle control module is configured to:
obtain a current value of the cruise control set speed;
obtain a current vehicle speed value; and
in response to the current vehicle speed value being less than the current value of the cruise control set speed, change the cruise control set speed to the current vehicle speed value plus a specified offset.

7. The vehicle control system of claim 1, wherein the vehicle control module is configured to decrease the cruise control set speed in response to detecting the at least one press input parameter at the brake pedal.

8. The vehicle control system of claim 7, wherein the vehicle control module is configured to:
determine a rate of acceleration of the vehicle;
compare the rate of acceleration to a specified acceleration threshold; and change the cruise control set speed to a current speed of the vehicle in response to the rate of acceleration being greater than the specified acceleration threshold for a specified time period.

9. The vehicle control system of claim 7, wherein the vehicle control module is configured to:

obtain a current value of the cruise control set speed;

obtain a current vehicle speed value; and in response to the current vehicle speed value being greater than the current value of the cruise control set speed, change the cruise control set speed to the current vehicle speed value minus a specified offset.

10. The vehicle control system of claim 1, further comprising at least one front vehicle camera configured to obtain images capturing at least a portion of a front field of view of the vehicle.

11. The vehicle control system of claim 10, wherein the vehicle control module is configured to:

detect a distance between the vehicle and a target object ahead of the vehicle in a same lane as the vehicle, via the at least one front vehicle camera;

obtain a current acceleration value of the vehicle;

obtain a current speed value of the vehicle; and in response to the current acceleration value being less than a specified acceleration threshold for a specified time period, and the distance being greater than a specified distance threshold, automatically change the cruise control set speed to the current speed value of the vehicle.

12. The vehicle control system of claim 10, wherein the vehicle control module is configured to inhibit automatically change the cruise control set speed in response to at least one of:

a distance between the vehicle and a target object ahead of the vehicle being less than a specified distance threshold;

a lateral acceleration value of the vehicle or a longitudinal acceleration value of the vehicle being less than a specified acceleration threshold;

a current speed value of the vehicle being below a speed threshold;

a cruise control disengage event occurring within a specified time period;

a cruise control feature being disabled; or a cruise control resume request being currently active.

13. The vehicle control system of claim 10, wherein the vehicle control module is configured to:

detect a disengagement of cruise control based on a press of the brake pedal while the at least one front vehicle camera does not detect a target object within a specified distance threshold in front of the vehicle;

subsequent to disengagement of cruise control, detect a target object within the specified distance threshold while the brake pedal is pressed; and in response to release of the brake pedal by the driver, engage the cruise control of the vehicle.

14. A method for adjusting vehicle cruise control settings, the method comprising:

automatically controlling, by a vehicle control module, a drive unit of a vehicle to target a cruise control set speed of the vehicle while a cruise control feature of the vehicle is engaged;

detecting at least one press input parameter associated with an accelerator pedal of the vehicle or a brake pedal of the vehicle, wherein the at least one press input parameter includes at least one of a length of the accelerator pedal or the brake pedal being pressed, a movement distance of the accelerator pedal or the brake pedal while being pressed, or a number of times the accelerator pedal or the brake pedal is pressed within a specified time period;

comparing the at least one press input parameter to specified cruise control adjustment criteria;

in response to the press input parameter satisfying the specified cruise control adjustment criteria, adjusting the cruise control set speed identifying that vehicle cruise control is enabled but not currently engaged;

obtaining a current steering angle of the vehicle;

obtaining a current longitudinal acceleration of the vehicle;

in response to the current steering angle being less than a specified curve threshold and the current longitudinal acceleration being greater than a specified acceleration threshold for a specified time period, automatically engaging vehicle cruise control;

obtaining a disengagement of cruise control based on a press of the brake pedal while at least one front vehicle camera does not detect a target object within a specified distance threshold in front of the vehicle;

subsequent to disengagement of cruise control, detecting a target object within the specified distance threshold while the brake pedal is pressed; and in response to release of the brake pedal by the driver, engaging the cruise control of the vehicle.

15. The method of claim 14, wherein adjusting the cruise control set speed includes modifying power supplied by the drive unit to increase or decrease a rotation speed of wheels of the vehicle.

16. The method of claim 14, further comprising adjusting the cruise control set speed without receiving an input at a steering wheel of the vehicle, without receiving an input at a lever of a steering column of the vehicle, and without receiving a voice command input.

17. The method of claim 14, further comprising increasing the cruise control set speed in response to detecting the at least one press input parameter at the accelerator pedal.

18. The method of claim 17, further comprising:

determining a rate of deceleration of the vehicle;

comparing the rate of deceleration to a specified deceleration threshold; and changing the cruise control set speed to a current speed of the vehicle in response to the rate of deceleration being less than the specified deceleration threshold for a specified time period.

19. The method of claim 17, further comprising:

obtaining a current value of the cruise control set speed;

obtaining a current vehicle speed value; and in response to the current vehicle speed value being less than the current value of the cruise control set speed, changing the cruise control set speed to the current vehicle speed value plus a specified offset.

* * * * *